United States Patent [19]
Morris et al.

[11] Patent Number: 5,306,893
[45] Date of Patent: Apr. 26, 1994

[54] WELD ACOUSTIC MONITOR

[75] Inventors: Richard A. Morris, Severna Park; Ronald C. Tate, Annapolis; Milton A. Matteson, Arnold, all of Md.

[73] Assignee: The United States of America as represented by the Secretary of the Navy, Washington, D.C.

[21] Appl. No.: 922,425

[22] Filed: Jul. 31, 1992

[51] Int. Cl.$^5$ .............................. B23K 9/095
[52] U.S. Cl. .................. 219/130.01; 395/22
[58] Field of Search .............. 219/130.01, 130.21, 219/137 PS, 124.34; 395/22; 307/201

[56] References Cited

U.S. PATENT DOCUMENTS

| | | | |
|---|---|---|---|
| 3,679,865 | 7/1972 | Jesnitzer et al. | 219/130.01 |
| 3,986,391 | 10/1976 | Vahaviolos | 219/130.01 |
| 4,435,631 | 3/1984 | Drouet . | |
| 4,650,958 | 3/1987 | Magori | 219/130.01 |
| 4,912,652 | 3/1990 | Wood . | |
| 4,914,603 | 4/1990 | Wood . | |
| 5,109,351 | 4/1992 | Simar . | |
| 5,159,660 | 10/1992 | Lu et al. | 395/22 |
| 5,204,872 | 4/1993 | Staib et al. | 395/22 |

OTHER PUBLICATIONS

Karsai et al, "Gas Tungsten Arc Weld Monitoring Using A Mapping Network", *Neural Networks*, 1988, p. 341.

Daniel DeMenthon et al "Learned Classification of Welding Modes by a Neural Network with Acoustic Inputs" Aug. 1989.

*Primary Examiner*—Clifford C. Shaw
*Attorney, Agent, or Firm*—Charles D. Miller

[57] ABSTRACT

A system for real-time analysis of weld quality in an arc welding process. The system includes a transducer which receives acoustic signals generated during the welding process. The acoustic signals are then sampled and digitized. A signal processor calculates the root mean square and peak amplitudes of the digitized signals and transforms the digitized signal into a frequency domain signal. A data processor divides the frequency domain signal into a plurality of frequency bands and calculates the average power for each band. The average power values, in addition to the peak and root mean square amplitude values, are input to an artificial neural network for analysis of weld quality. Arc current and/or arc voltage signals may be input to the A/D converter alone or in combination with the acoustic signal data for subsequent signal processing and neural network analysis.

15 Claims, 2 Drawing Sheets

WELD ACOUSTIC MONITOR

FIELD OF THE INVENTION

The invention relates to the evaluation of defects in welds and, in particular, to a system which analyzes one or more weld signatures produced during arc welding to provide real-time analysis of weld quality.

BACKGROUND OF THE INVENTION

Arc welding consists of several processes that utilize an electric arc produced by electric current passing through an ionized gas as a source of heat to melt and join metals. Typically, the welding arc is formed between the piece being welded, or base metal, and an electrode. A "good" weld is commonly defined as a weld which fuses metals in a bond having strength to withstand any stresses which are expected to be encountered.

There are many causes of defects which can occur during the welding process, preventing this fusion from occurring and creating welds which will often not withstand stress. Specific types of weld defects which can occur during the arc welding process include a condition commonly referred to as spatter in which a considerable amount of spatter or filler metal is produced which does not enter the weld due to motion of the filler metal during the welding process. Loss of shielding gas, used to protect the arc and weld zones from air and provide desired arc characteristics in gas metal arc welding, can further result in weld defects.

Additionally, the condition known as arc blow can detrimentally affect the welding process. This condition primarily occurs when a change in direction of current flow as it enters the work and is conducted to the work lead, or when there exists an asymmetric arrangement of magnetic material around the arc, as in when welding is done near the end of ferromagnetic materials. Arc blow occurs as a result of magnetic disturbances surrounding the welding arc, resulting in the arc being directed away from the point of welding.

Weld contamination is another type of weld defect often occurring during welding. Weld contamination results when foreign materials or substances, such as brass, concrete, or plastic, commonly present in factory environments, are introduced into the welding material, weakening the weld subsequently formed. There are numerous other events which can occur during the welding process, adversely affecting the quality of the weld produced.

In some instances, weld defects, such as those described above, are identifiable to the ear of an experienced welder, although identification in this manner can be hampered when the welding is occurring in an environment having a significant amount of background noise, such as a factory setting. In automated welding systems, however, it is more difficult to identify and correct weld defects. In particular, in robotic welding systems, real-time analysis of weld quality is required so that the system can either correct the situation causing the defect, or in the alternative, provide notification to an operator that such a defect has occurred.

SUMMARY OF THE INVENTION

The invention provides an intelligent system for real-time assessment of weld quality in which a neural network is used to evaluate weld signature input data generated during an arc welding process and provide an output indicative of the quality of the weld being produced. The system includes a transducer for receiving the acoustic signals generated during the welding process. An A/D converter is connected to receive the output of the transducer. The A/D converter samples and digitizes the acoustic signal. The digitized signal produced by the A/D converter is output to a signal processor. Arc current and/or voltage signals may be input to the A/D converter alone or in combination with the acoustic signals.

The signal processor calculates the peak amplitude and root mean square (RMS) amplitude values of the digitized signal received from the A/D converter. In addition, the signal processor transforms the digitized signal into a frequency domain signal via a 2048 point fast fourier transform. The system further includes a data processor connected to the signal processor. The data processor divides the frequency domain signal into thirty equal frequency bands and calculates the average power for each band.

The peak amplitude, RMS amplitude, and average power values are then provided as inputs for an artificial neural network (ANN). An input representing the amount of current used to form the arc may also be provided. The artificial neural network is taught using numerous acoustic signals having known output values representing welds of varying quality. The neural network analyzes the amplitude and average power values to determine the quality of the weld and generates an output value indicative of the weld quality approximately 10 times per second, enabling real-time analysis of the welding o process. Input of a plurality of weld signature input data signals improves ANN generalization.

A system for determining the quality of a weld produced in an arc welding process is disclosed wherein the system comprises a pressure sensor positioned to receive an acoustic signal produced during the welding process. An A/D converter is connected to the pressure sensor for sampling and digitizing the acoustic signal, thereby producing a digitized signal. A signal processor is connected to the A/D converter for calculating the root mean square and peak amplitude of the digitized signal and further transforms the digitized signal into a frequency domain signal.

A data processor is connected to the signal processor for dividing the frequency domain signal into a plurality of frequency bands and for computing the average power of each of the frequency bands. The average power values, root mean square amplitude, and peak amplitude are provided as inputs to an artificial neural network. The artificial neural network analyzes the inputs and generates an output indicating the quality of the weld being produced during the welding process.

A method of analyzing the quality of a weld produced during an arc welding process is further disclosed. The method comprises the steps of receiving an acoustic signal produced during the welding process and sampling and digitizing the acoustic signal. The peak amplitude and root mean square amplitude of the digitized signal are calculated and the digitized signal is transformed into a frequency domain signal. The frequency domain signal is divided into a plurality of frequency bands and the average power of each frequency band is calculated. The average power, peak amplitude, and root mean square amplitude are provided as input to an artificial neural network to analyze the quality of the weld. An input representing the amount of current used to form the welding arc may also be provided.

DETAILED DESCRIPTION OF THE INVENTION

Figure 1:
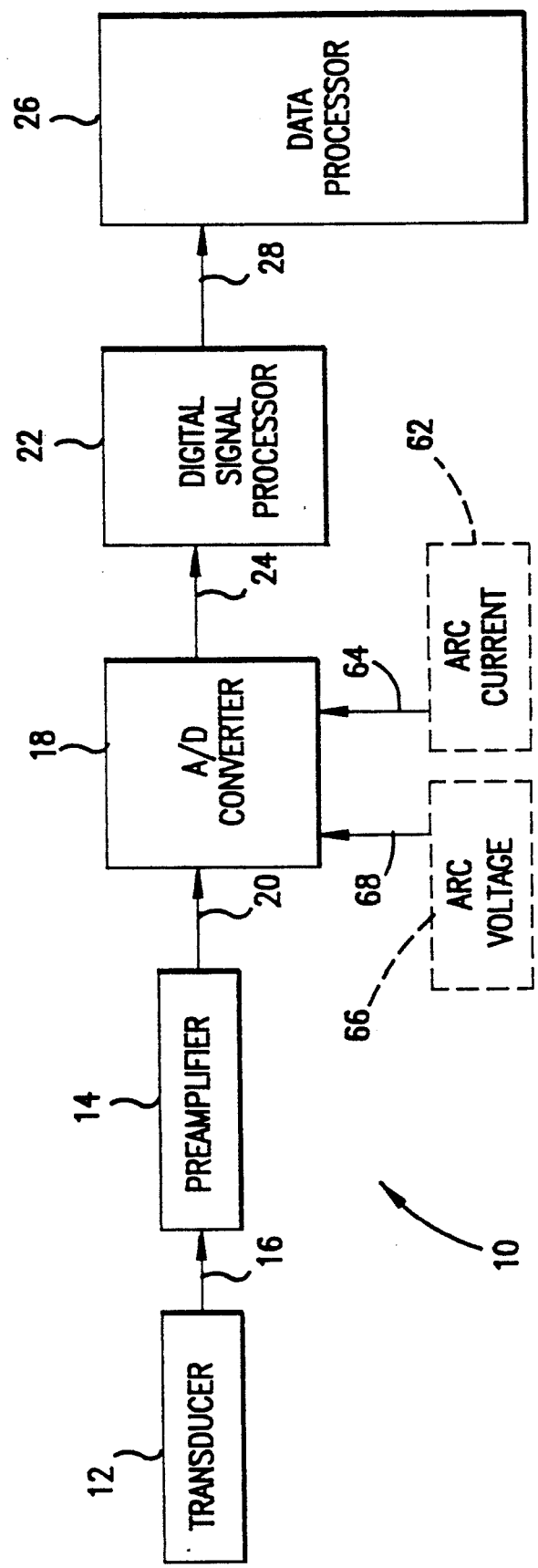
FIG. 1 is a block diagram of the weld acoustic monitoring system of invention.

A block diagram of a weld acoustic monitoring system 10 in accordance with the present invention is shown in FIG. 1. The system includes a transducer 12 which receives an acoustic signal produced during arc welding. The transducer comprises a pressure sensor or microphone, mounted to a weld head (not shown) and positioned to receive airborne acoustic signals generated during the welding process. The microphone 12 is positioned to maintain a constant orientation with respect to the weld zone, and is preferably mounted between eight and twenty inches from and aimed approximately (within ±30°) at the arc/molten puddle region produced during welding. Preferably, the microphone has a dynamic frequency bandwidth in the range of at least 0–12 kHz and a small size of approximately ¼" so that cable connection interference is minimized. A preferred microphone for use in the system is the B&K Condenser Microphone Type No. 4135 manufactured by B&K Microphones, of Cambridge, Massachusetts. Those skilled in the art will recognize, however, that other microphones having a suitable frequency range and size could also be used.

The sensor 12 is connected to an associated preamplifier 14 via a signal line 16. The preamplifier 14 provides impedance conversion, thereby facilitating use of cables having relatively low input impedances. A preferred preamplifier is the B&K Microphone Preamplifier Type 2633, also manufactured by B&K Microphones.

The output of the pre-amplifier 14 is connected to an A/D converter 18 over a signal line 20. The A/D converter 18 operates in a conventional manner to convert the analog acoustic signal data output by the preamplifier 14 into a digital data signal. A preferred sampling rate of the A/D converter 18 has been found to be approximately 32 kHz.

The digital output of the A/D converter 18 is provided to a digital signal processor 22 over a signal line 24. As will be explained in more detail below, the processor 22 determines the 0–12 kHz power spectrum of the digital signal output by the A/D converter 18. The A/D converter 18 and digital signal processor 22 are preferably combined in a unitary system such as the Banshee/SPOX System manufactured by Atlanta Signal Processors, Inc. of Atlanta, GA. Those skilled in the art will recognize, however, that separate components could also be used in the system.

The output of the digital signal processor 22 is connected to a data processor 26 via a signal line 28. The data processor 26 averages the power spectrum received from the digital signal processor 22 as described below. The data processor 26 further includes an artificial neural network which analyzes input data to determine weld quality. The data processor preferably comprises a 386 central processing unit and associated 387 co-processor.

Figure 2:
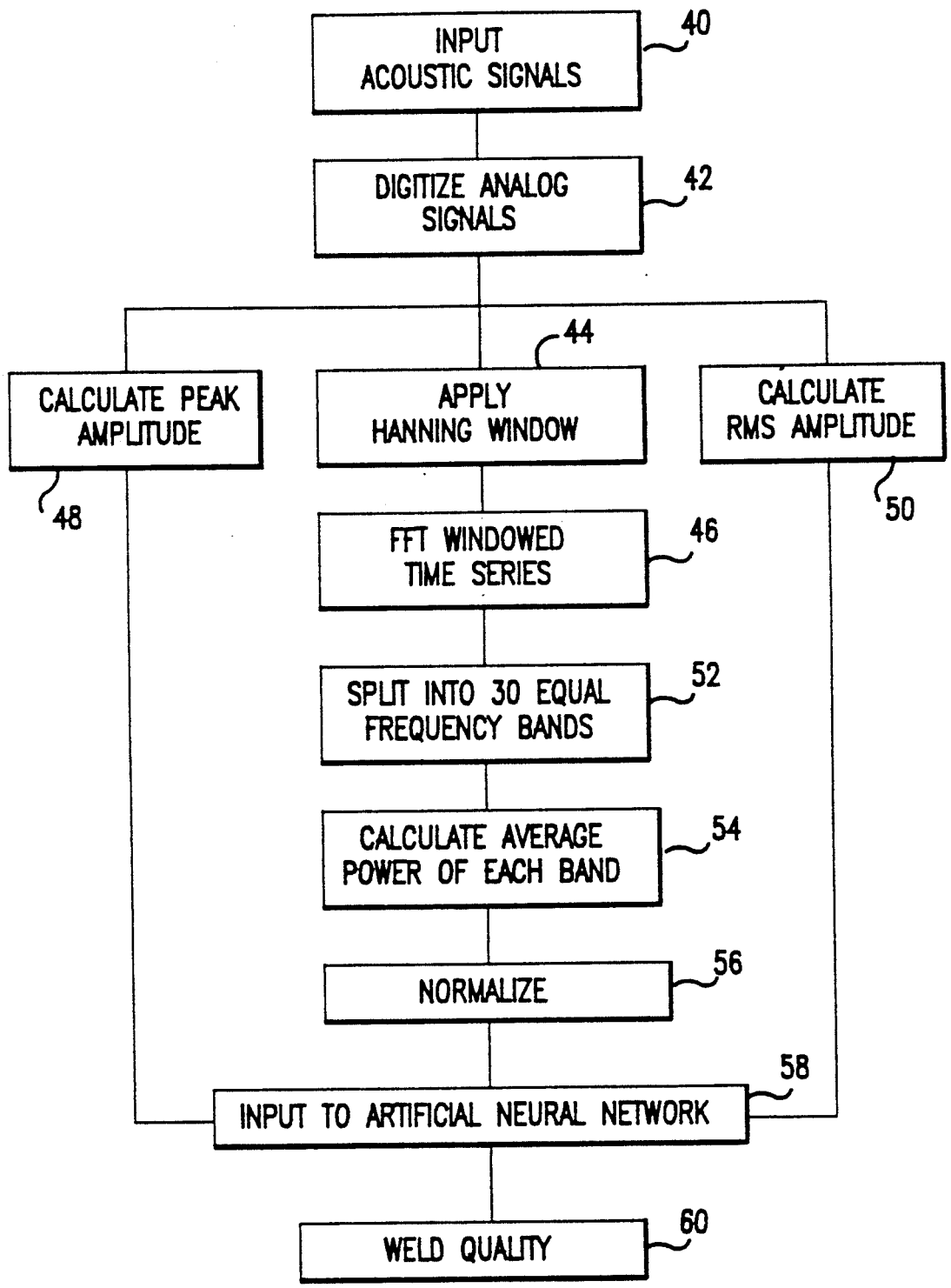
FIG. 2 is a flow diagram illustrating the weld quality analysis process.

The acoustic weld monitoring system operates in accordance with the flow diagram illustrated in FIG. 2. Acoustic signals produced during the arc welding process are continuously input to the system through the microphone 12 and associated pre-amplifier 14 as depicted by activity block 40. The amplified analog acoustic signals output by the pre-amplifier 14 are input to the A/D converter 18 over the signal line 20 where they are digitized at a rate of 32 kHz, represented at activity block 42.

The digital data signal output by the A/D converter 18 over the signal line 24 is input to the digital signal processor 22 which determines the power spectrum of the digitized acoustic signal using well-known fast fourier transform (FFT) techniques. Preferably, the power spectrum is calculated for the 0–12 kHz range. In particular, a window, such as a Hanning window, is applied to the digital signal from the A/D converter as represented by activity block 44. Subsequently, as depicted by activity block 46, the windowed time series is transformed into the frequency domain via a multi-point FFT, preferably comprising 2048 points.

In addition to determining the power spectrum of the digitized acoustic signal, the digital signal processor 22 calculates the peak amplitude and root mean square (RMS) amplitude of the digitized acoustic signal received from the A/D converter for a fixed time length, as represented by activity blocks 48 and 50, respectively. The peak amplitude value, RMS amplitude value, and power spectrum data is then transmitted by the digital signal processor 22 to the data processor 26 via the signal line 28.

The data processor 26 divides the power spectrum into thirty equal 400 Hz bands, as represented by activity block 52, and subsequently calculates the average power for each band, as represented by activity block 54. The averaged power values are then normalized to unity, as depicted by activity block 56. As represented by activity block 58, the thirty normalized values, in addition to the RMS and peak amplitude values, are then input to the artificial neural network for analysis of weld quality.

An artificial neural network (ANN) is a computational architecture which comprises a network of neural units interconnected to simulate features of a biological neural network. The neural units, or nodes, are arranged in layers with interconnections made between units of successive layers. The network comprises one input layer, one output layer, and optionally, several "hidden" layers therebetween.

The neural unit has an activation level which depends on the signals received from preceding units connected thereto. When several neural units are activated, the activation signals can propagate to other units through the connections. The connections between neural units have different weights, and the connections transmit activation signals in proportion to their weights.

Each neural unit acts as a simple processing unit. Physically, the unit may be one of numerous computer processors or a location in a computer memory. Inputs from all input connections to the node are summed and amplified with a sigmoid-shaped gain before being transmitted to the output connections of the node. In practice, the output of each node is smooth, so that a soft binary decision in the range of 0 to 1 is produced.

The network is taught by processing a series of input values having corresponding known output values. The network then learns by determining the difference between the produced and known output values. The weights of each neural unit are modified in a learning algorithm to generate a series of output values which more closely match the known output values. This iterative process continues through several cycles until the output values generated by the network are within a predetermined range of the known output values. When presented with enough input vectors, a learning algorithm can develop a network that produces the correct output response.

Artificial neural networks are most commonly trained using the learning algorithm of back-propagation. In back propagation, input values having known output values are presented to the artificial neural network as described above. The actual output generated by the network is compared with the desired output, and the difference between the two output values is backpropagated through the layers of interconnections, the weights adjusted accordingly so as to bring the actual output closer to the desired output value.

Artificial neural networks and teaching algorithms of this type are well known in the art and described in U.S. Pat. Nos. 5,109,351, 4,914,603, and 4,912,652, herein incorporated by reference.

To teach the artificial neural network for the o system of the present invention, a large number of weld acoustic signals were compiled. Numerous welds were made under controlled conditions to create a large variety of acceptable and unacceptable welds. Welds were made to simulate varied defect conditions including welding contamination, loss of shielding gas, arc blow, and spatter, as described above. Approximately 9,000 weld samples were recorded in welding environments with varying degrees of background noise.

The acoustic signals for each weld were processed in the manner described above, in accordance with activity blocks 40-56 as shown in FIG. 2, and recorded onto a digital file format in the processor. The acoustic signal data was then input into a plurality of artificial neural networks having different numbers of input nodes and hidden layers. The effectiveness of each network was evaluated by comparing the network generated output values with the known output values to determine the neural network configuration that resulted in best performance.

Preferably, a neural network development software package is used to teach, test, and construct the artificial neural network. These commercially available software programs enable a user to construct a neural network with a specified number of input nodes, hidden layers, and output nodes. A preferred software package is the NeuralWorks Software available from NeuralWare of Pittsburgh,.PA. Other well-known techniques for constructing neural networks may also be used.

Using NeuralWorks, an artificial neural network employing three hidden layers was constructed. A preferred neural network configuration for the system of the present invention comprises an input layer of the network having thirty-two processing elements corresponding to the thirty-two input values derived from the weld acoustic signal sample described above. The network also includes three hidden layers. The output layer of the ANN comprises one node whose soft binary output varies from 0-1, where a 0 output indicates a bad weld and an output of 1 indicates a good weld, with varying degrees of weld quality there between. An output value of 0.8 is the preferred threshold value indicative of a bad weld.

Once the desired neural network is constructed and taught in the manner described above, the network is transformed into computer language source code and entered into the processor 26. Preferably, this computer language conversion is made utilizing a software program, such as the NeuralWorks Designer Pack from NeuralWare Incorporated which takes a network designed using the NeuralWorks system described above and transforms the network into C source code for integration into the processor 26. Those skilled in the art will appreciate the neural network may also be programmed using conventional programming techniques in a wide variety of suitable programming languages.

When the source code corresponding to the neural network has been programmed within the processor 26, real-time analysis of the weld acoustic signals is effected. Acoustic signals are input to and processed by the system 10 in the manner described above to obtain the thirty averaged power values, peak amplitude value, and RMS value from the sampled acoustic signal. These input values are then analyzed by the processor 26 in accordance with the source code entered corresponding to the artificial neural network to determine the quality of the weld. The output of the processor 26, represented at activity block 60 (FIG. 2), is provided to an operator or a control system for analysis and/or correction of the weld process.

With the system of the present invention, weld quality sampling at a rate of 10 times per second is achieved. The system processes acoustic signals produced during the welding process at a rate of 10 Hz, enabling correction of a defect-causing situation within 0.25 seconds.

In another embodiment of the invention, the transducer 12 may comprise an acoustic transducer attached to a plate providing support for the piece being welded. In this embodiment, the plate-borne acoustic signal generated during the welding process is received by the transducer 12 and sent to the preamplifier 14 via the signal line 16. The acoustic signal from the plate is processed in the manner previously described and input to the ANN for analysis. The plate-borne acoustic signal data may be used alone or in combination with the airborne acoustic signal data to asses weld quality.

In yet another embodiment of the invention, weld signature data in the form of a arc current signal 62 (shown in phantom in FIG. 1) indicating the amount of current used to form the arc is provided to the A/D converter 18 for subsequent signal processing and analysis by the artificial neural network. This current signal 62 is preferably derived from a current shunt (not shown) and input to the A/D converter 18 over a signal line 64 to be digitized. Further signal processing is effected in the manner described above.

As the level of current used to form the arc changes, the arc sound also varies. Typically, currents in the range of 190-350 amps are used and the arc sound changes across this range. Thus, in environments where many current levels are used, this embodiment can provide improved analysis of weld quality. The current input 62 may be used alone or in combination with one or both of the acoustic signal inputs described above for weld quality assessment. When this arc current input 62 is provided, the artificial neural net may be trained in the manner described above by inputting welds of varying quality having known current levels and output values.

Weld signature data in the form of an arc voltage signal 66 (shown in phantom in FIG. 1) may be provided to the A/D converter 18 for subsequent signal processing and ANN analysis in a further embodiment of the invention. The arc voltage signal 66 is obtained from a power supply that provides sufficient voltage to form the arc preferably via a voltage divider (now shown) and is input to the A/D converter 18 via a signal line 68. The A/D converter digitizes the voltage signal 66 and the digitized signal is then processed in the manner described above and input to the ANN for analysis. Again, the voltage signal input to the system may be used alone or in combination with one or more of the weld signature inputs as set forth above to provide real-time assessment of weld quality. The neural network is trained accordingly with a set of input data representing welds of varying quality having known voltage and/or current levels and output values.

Those skilled in the art will recognize that the sampling rates, power spectrum ranges, and specific FFT parameters set forth above are merely illustrative, and that many other variations to these parameters are possible and within the scope of the present invention. As will further be apparent to those skilled in the art, various other modifications and adaptations of the embodiments described above will become readily apparent without departure from the spirit and scope of the invention, the scope of which is defined in the appended claims.

What is claimed is:

1. A monitor for assessing the quality of a weld produced during an arc welding process in real time comprising:
   an A/D converter for receiving at least one weld signature input signal and for sampling and digitizing said input signal, thereby producing a digitized signal;
   a signal processor connected to said A/D converter for calculating the root mean square amplitude and peak amplitude of said digitized signal, wherein said signal processor further transforms said digitized signal into a frequency domain signal;
   a data processor connected to said signal processor for dividing said frequency domain signal into a plurality of frequency bands and for computing the average power of each of said frequency bands; and
   an artificial neural network, wherein said average power values, said root mean square amplitude, and said peak amplitude are provided as inputs to said artificial neural network, said artificial neural network analyzing said inputs and generating an output indicating the quality of said weld being produced during said welding process.

2. The monitor of claim 1, wherein said A/D converter is connected to a transducer positioned to receive an airborne acoustic signal produced during said welding process.

3. The monitor of claim 1, wherein said A/D converter is connected to a transducer attached to a weld support plate to receive a plate-borne acoustic signal produced during said welding process.

4. The monitory of claim 1, wherein said A/D converter is connected to receive an arc current signal indicating the amount of current used to form a welding arc.

5. The monitor of claim 1, wherein said A/D converter is connected to receive an arc voltage signal indicating the amount of voltage used to create a welding arc.

6. A system for determining the quality of a weld produced in an arc welding process comprising:
   a pressure sensor positioned to receive an acoustic signal produced during said welding process;
   an A/D converter connected to said pressure sensor for sampling and digitizing said acoustic signal, thereby producing a digitized signal;
   a signal processor connected to said A/D converter for calculating the root mean square amplitude and peak amplitude of said digitized signal, wherein said signal processor further transforms said digitized signal into a frequency domain signal;
   a data processor connected to said signal processor for dividing said frequency domain signal into a plurality of frequency bands and for computing the average power of each of said frequency bands; and
   an artificial neural network, wherein said average power values, said root mean square amplitude, and said peak amplitude are provided as inputs to said artificial neural network, said artificial neural network analyzing said inputs and generating an output indicating the quality of said weld being produced during said welding process.

7. The system defined in claim 6, further including a preamplifier connected between said pressure sensor and said A/D converter.

8. The system defined in claim 6, wherein said signal processor transforms said digitized signal into a frequency domain signal by means of a multi point fast fourier transform.

9. The system defined in claim 6, wherein said frequency domain signal is the 0–12 kHz power spectrum of said acoustic signal.

10. The system defined in claim 9, wherein said data processor divides said frequency domain signal into thirty equal frequency bands.

11. The system defined in claim 6, wherein said artificial neural network is further provided with an input representing at least one other weld signature input signal.

12. A method of analyzing the quality of a weld in real time, wherein said weld is produced during an arc welding process, said method comprising the steps of:
   sensing an acoustic signal produced during said welding process with a microphone;
   sampling and digitizing said acoustic signal using an A/D converter;
   calculating the peak amplitude value and root mean square amplitude value of said digitized signal and transforming said digitized signal into a frequency domain signal using a digital signal processor;
   dividing said frequency domain signal into a plurality of frequency bands and calculating the average power value of each frequency band using a data processor; and
   feeding said average power values, said peak amplitude value, and said root mean square amplitude value to an artificial neural network for analysis of the quality of said weld, wherein said artificial neural network is taught with a plurality of inputs having a known set of outputs, said inputs representing numerous different weld conditions.

13. The method defined in claim 12, wherein said step of transforming said digitized signal into a frequency domain signal comprises the steps of applying a window to said digitized signal and transforming said windowed signal into the frequency domain via a multi-point fast fourier transform.

14. The method defined in claim 12 wherein said step of calculating the average power of each frequency band further includes the step of normalizing the average power values.

15. The method defined in claim 12, further including the step of providing at least one other weld signature input signal to said artificial neural network.

* * * * *